May 4, 1954  R. P. GUTTERMAN  2,677,794
ELECTRICAL CONDENSER AND PROCESS FOR ITS MANUFACTURE
Filed March 25, 1949
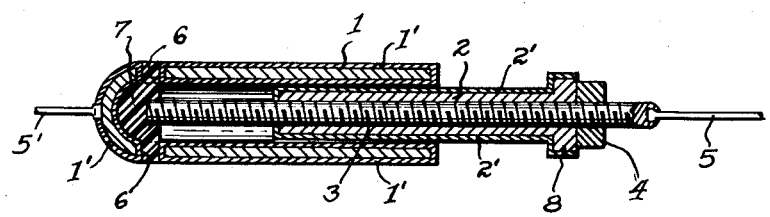
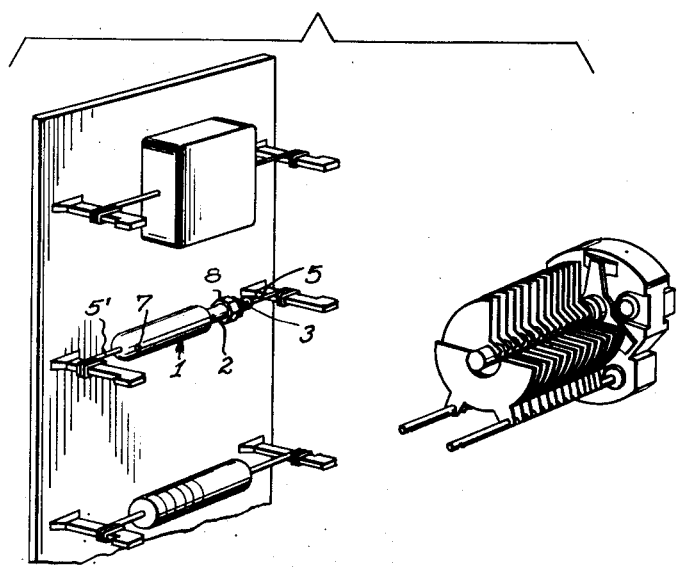
INVENTOR.
*Robert P. Gutterman*
BY
*Cushman, Darby & Cushman*
ATTYS.

Patented May 4, 1954

2,677,794

UNITED STATES PATENT OFFICE 2,677,794

ELECTRICAL CONDENSER AND PROCESS FOR ITS MANUFACTURE

Robert P. Gutterman, Silver Spring, Md., assignor to Engineering Research Associates, Inc., St. Paul, Minn., a corporation of Minnesota Application March 25, 1949, Serial No. 83,494

14 Claims. (Cl. 317—249)

This invention relates to electrical condensers, such as those generally used in radio, television, or similar electrical circuits.

More particularly, this invention relates to electrical condensers which are semi-variable in nature. The purpose of such semi-variable electrical condensers is generally to provide a capacity which can be varied at will during adjustments in the manufacture or subsequent maintenance of a piece of electronic equipment, but which is then locked at a fixed value and subsequently is not further varied by the operator of the equipment during the normal course of operations. Condensers of this type are popularly known as "trimmer condensers" or "trimming condensers," but the applications of the instant invention are not limited to the field of such devices.

It is a principal object of this invention to provide a semi-variable electrical condenser which shall be considerably smaller than existing devices of this type of equivalent electrical rating.

It is a further object of this invention to provide a miniature semi-variable electrical condenser which shall be useful in connection with the present tendency in the entire radio art toward miniaturization, both of components and complete assembly.

It is a further object of this invention to provide a miniature semi-variable electrical condenser, or trimmer condenser, which shall maintain the high quality of presently available components of this type but which shall be more rugged and easier and cheaper to manufacture.

It is a further object of this invention to provide a miniature semi-variable electrical condenser which will mount by its own "pigtail" leads in the same manner as the usual mounting of a small resistor, there being no necessity for auxiliary mounting screws, brackets, etc.

It is a further object of this invention to provide a miniature semi-variable electrical condenser having certain desirable electrical qualities, such as a low coefficient of capacity change with respect to changes in temperature, and also a linear relationship between capacity and displacement.

Still further objectives and the entire scope of applicability of the present invention will become apparent from the detailed description given hereinafter; it should be understood, however, that the detailed description, while indicating a preferred embodiment of the invention, is given by way of illustration only, since various changes and modifications within the spirit and scope of the invention will become apparent to those skilled in the art from this detailed description.

A more complete understanding of the structure involved with this invention may be had by reference to the accompanying drawing in which Figure 1 is a longitudinal sectional view of the preferred form of the miniature semi-variable electrical condenser incorporating the features of this invention;

Figure 2 is an illustration in perspective of a typical installation of the device illustrated in Figure 1, on a panel which also mounts a mica condenser and a one watt resistor drawn to the same scale, and also an illustration of a standard semi-variable electrical condenser or trimmer which is likewise to the same scale.

Referring now to Figure 1, the miniature semi-variable electrical condenser comprises the co-acting metal cylinders 1 and 2 in which the inner cylinder 2 is capable of moving in and out of the hollow cylinder 1, there being a sliding fit between the outer surface of cylinder 2 and the inner surface of cylinder 1. As will be explained hereinafter, these cylinders are made of metal, and preferably, but not necessarily of the metal nickel, and the surfaces thereof are oxidized under controlled conditions to provide insulating layers of metallic oxide 1' and 2' upon the metal cylinders. Only the outer surface of inner cylinder 2 and the inner surface of outer cylinder 1 (and in some cases only one of these two surfaces) is required to have such an insulating oxidized coating; this coating, if it is formed elsewhere by the oxidizing action described hereinafter, may be removed from all other surfaces and, in particular, it must be removed from the threaded inner surface of cylinder 2 so that it may engage in an electrically conductive fashion with the central lead-screw 3. The metal cylinders may be made of a metal base which is plated or overlaid with coating of another metal and an oxide coating then formed upon the coating metal.

Also carried on lead-screw 3 is a lock-nut 4 which may be either metallic or nonmetallic, although it is preferable to fabricate lock-nut 4 from the same material as cylinder 2. In one end of lead-screw 3 there is inserted a lead wire 5 which may be swaged, brazed, or spot-welded in position, or otherwise retained by customary methods.

One end of outer cylinder 1 is formed to make a closed hemispherical shell as shown in Figure 1. Into this end is inserted the lead wire 5', again being retained by being swaged, brazed, spot-welded or by any other method commonly practiced in the art. This lead 5', and also the other lead 5, are fabricated in the manner generally used throughout the radio art in the manufacture of "pigtail" leads, that is, they are made of a soft metal, usually soft drawn copper, and given an outer coating of tin or solder to facilitate their subsequent assembly into a complete piece of electronic equipment. Near the end of the closed portion of cylinder 1 there are provided two or more small holes 6, the purpose of which is to permit the injection of a plastic mounting 7 and to provide means for locking the plastic material 7, after hardening, into the end of cylinder 1. This plastic material 7 causes the other end of screw 3 to be located properly within the interior space cylinder 1. In the preferred embodiment of this invention, this plastic mounting will be the last step in manufacture, after which the device is ready for use as a semi-variable electrical condenser.

In use, the inner surface of cylinder 1 and the outer surface of cylinder 2 are the coacting electrostatic units; pigtail leads 5 and 5' are the means for incorporating this component in a circuit and simultaneously the means for mounting the component on a terminal board or in a chassis; the mating threaded surfaces of cylinder 2 and screw 3 are the means for varying the electrostatic capacity as between leads 5 and 5' without affecting the mechanical distance between these two leads; finally, lock-nut 4 is the means for locking a given setting on the device.

In the preferred form of my invention it will be seen that all of the component parts readily lend themselves to the techniques of mass production. In greater detail, I prefer to make the outer cylinder 1 by deep-drawing from a sheet of metal; this is easily accomplished in the case of nickel which has excellent deep-drawing properties and which also lends itself well to the oxidation process hereinafter described. Techniques for performing this deep-drawing are well known in the radio art since deep-drawn nickel structures are frequently used for the internal parts of radio vacuum tubes. Alternatively, the outer cylinder 1 could be swaged to shape from drawn seamless tubing. In either case, perforation for the holes 6 presents no problem, particularly insofar as these holes need not be accurately made and since furthermore an internal burr produced by this perforating operation might prove additionally helpful in the retention of the plastic insert 7.

The inner cylinder 2 is obviously something which can be manufactured cheaply and in great quantities by automatic screw machinery. I prefer to form this unit with a head 3, which may be either square or hexagonal in cross section, so that a miniature wrench may subsequently be applied thereto for the purpose of adjusting the electrostatic capacity.

By the above methods for fabricating cylinders 1 and 2, I am able to maintain accurate control of the mating diameters so that an accurate fit will result automatically, thereby eliminating the necessity for any eventual fitting or adjusting. In practice I have found that a clearance of .0003" is more than adequate. This clearance, if employed with nonlubricating cylinders of metal, plastics, ordinary ceramics or glass, would be considered a "push" or "force" fit. However, these mating surfaces are not pure metal but rather are the oxides of a metal and preferably they are the oxides of nickel. I have found by actual experiment the unusual result that, even with this small clearance, the coacting cylinders coated with nickel oxide produce a perfectly free-running fit.

I have also found it entirely practical to fabricate cylinders 1 and 2 to only approximate dimensions and then, subsequent to oxidation, to size these cylinders by means of sizing dies to obtain exact dimensions. The nature of the oxide surface, particularly in the case of certain metals such as nickel, is such that it adheres so firmly to the base metal that there is absolutely no tendency for this oxide layer to become fractured by these sizing operations.

The inner screw 3, the lock-nut 4, and the leads 5 and 5' can be manufactured in a manner that is obvious to anyone skilled in the art. For certain applications I prefer to have the screw 3 and the cylinder 2 constructed of the same metal or, where this not feasible, I find it desirable to plate screw 3 with a metal which is electrically similar to the metal of cylinder 2.

The plastic insert 7 should be formed from a material possessing both good electrical and mechanical properties. There are a great many such materials available as is apparent to anyone skilled in the plastic arts, and the choice of such material is not a subject of this invention. A cast thermo-setting styrene plastic is suitable for a condenser which is to have a low residual capacity when the condenser is adjusted to produce its minimum, or whenever a high electrical Q is required. If these requirements can be relieved, then one of the pressure-moulded plastics may be substituted for polystyrene in manufacture. Likewise there may be applications in which a flexible insert may be preferable, e. g., a polyethylene or polyfluorethylene can be used. The use of a flexible insert has the advantage of allowing the mating cylinders to telescope without binding even where the lead-screw 3 is not very accurately centered.

Cylinders 1 and 2, if they are made of nickel, may be treated in a manner which is described in detail in my application for U. S. Letters Patent, Serial No. 49,022, dated September 13, 1948, which is now abandoned. This application describes fully how such oxidation may be effected, and presents complete instructions as to the temperature and time and the results expected from variations in the different governing factors. There is no need to repeat this material here except to state that, by oxidizing nickel under suitably controlled conditions of temperature and time, there results on the surface of the nickel an extremely hard, flexible, and nonporous coating consisting of mixed oxides of nickel. This coating has excellent electrical properties including a high dielectric constant, a high puncture strength (or ability to withstand high voltages), and simultaneously an adequately high Q. On the mechanical side, the coating is uniform and firmly adherent to the base metal, even after passage through sizing die as indicated previously. This coating is also responsible for the rather amazing result of permitting a freely running fit between mating cylinders having a clearance less than .0003".

I have found by actual experiment that condensers prepared in the foregoing manner provide an effective capacity of 1000 micro-microfarads per square inch of active surface. Since current practice in the radio industry indicates that semi-variable electrical condensers are seldom required to have a maximum capacity greater than 200 micro-micro-farads, it follows that a condenser built on the foregoing principle will require only a 0.2 square inch of active surface. This value can be obtained by cylinders 1 and 2 if they are approximately ½" long and ⅛" diameter at their mating surfaces. Thus, allowing adjustment to minimum capacity and allowing adequately for the wasted space required by lock-nut 4 and plastic insert 7, it follows that a 200 micro-micro-farad condenser can be made less than $\frac{3}{16}''$ in diameter and about 1″ long.

The above dimensions are by way of illustration and not intended as one of limitation. However, it is obvious to anyone skilled in the art that I have, by the foregoing technique, produced a semi-variable electrical condenser which, for its electrical rating, is considerably smaller than anything else currently available. In this, I have achieved true miniaturization which fact is illustrated by Figure 2. This shows a semi-variable electrical condenser fabricated in accordance with this disclosure mounted between a small mica condenser and a one watt resistor, all drawn to the same scale. The ease and convenience of this mounting is obvious; likewise the ease and convenience for adjustment is apparent by inspection. Also illustrated in Figure 2 is a standard semi-variable electrical condenser of approximately the same electrical rating and drawn to the same scale; this shows a rather striking nature of the reduction in space which I have achieved.

I claim:

1. A semi-variable electrical condenser comprising in combination inner and outer telescoping tubes of metal coated with an adherent coating of a nickel oxide, adjacent surfaces of said tubes being in sliding engagement with one another, means for adjusting the amount of insertion of the inner tube into the outer tube, said means comprising a lead screw and a threaded portion on one of the telescoping tubes, and a means for locking the amount of insertion of the inner cylinder into the outer cylinder.

2. In a semi-variable electrical condenser as claimed in claim 1, means for attaching terminals thereto which terminals do not change their position or separation in the course of adjustment of the condenser.

3. In a condenser as claimed in claim 2, the provision of terminals which act as the mechanical mount of the entire unit.

4. A variable electrical condenser as claimed in claim 1 in which the metal is nickel and in which the oxide coating thereon is a mixture of oxides of nickel.

5. A condenser as claimed in claim 1 wherein the telescoping tubes are made of a metal which has been nickel plated, with the nickel plating having a nickel oxide coating on the surface thereof.

6. A semi-variable electrical condenser comprising in combination an outer tube having an adherent coating of nickel oxide on the inside surface thereof, said tube having one end thereof closed, an inner tube which telescopes into the open end of said outer tube, said inner tube having an adherent coating of nickel oxide on the outside surface thereof, said outside and inside surfaces being in slidable engagement with one another a metal lead screw fastened at one end axially within said outer tube to the closed end of said outer tube, said inner tube being threaded upon said lead screw, and means for locking said inner tube against rotation about said lead screw.

7. A condenser as claimed in claim 6 wherein said lead screw is fastened at one end to the closed end of the outer tube by means of a body of plastic material secured within the closed end of the outer tube.

8. A condenser as claimed in claim 6 wherein said locking means comprises a nut threaded upon said lead screw for abutting engagement with the outer end of said inner tube.

9. A condenser as claimed in claim 6 wherein a rigid lead wire is fastened in electrical contact with said outer tube.

10. A condenser as claimed in claim 9 wherein a rigid lead wire is fastened to the outer end of said lead screw.

11. A variable electrical condenser as claimed in claim 6 wherein said metal is nickel and said adherent coating is a mixture of oxides of nickel.

12. A semi-variable electrical condenser comprising in combination an outer metal tube having a closed end, the inner surface of the tube being coated with an adherent coating of nickel oxide, an inner tube telescoping within the outer tube, an adherent coating of nickel oxide on the outer surface of the inner tube, the oxide surfaces of the telescoping portions of said inner and outer tubes being in slidable engagement with one another, a portion of plastic material secured within said outer tube to the closed end thereof, a lead screw upon which said inner tube is threaded fastened at one end axially within said outer tube by being embedded in said body of plastic material with the other end of said lead screw extending beyond the open end of said outer tube, a nut threaded upon the lead screw for abutting engagement with the outer end of the inner tube, a rigid lead wire fastened in an electrical connection to the closed end of the outer tube and a second rigid lead wire fastened to the free end of said lead screw.

13. A condenser as claimed in claim 12 wherein said outer tube has perforations through the walls thereof adjacent the closed end with portions of the plastic material contained within the closed end of the outer tube extending into said perforations.

14. A process for forming the electrodes of a variable condenser which comprises fabricating electrodes from a metal to approximately the correct dimensions, forming a nickel oxide layer on the surfaces of the electrodes by heat treatment under oxidizing conditions and then shaping the oxide coated electrode by forcing an expanding tool through the electrode to shape the electrode to the final dimensions whereby an electrode of exact size is formed free from any warpage or any surface imperfections which arose from the oxidation process.

References Cited in the file of this patent

UNITED STATES PATENTS

| Number | Name | Date |
|---|---|---|
| 1,632,130 | Haddock | June 14, 1927 |
| 1,672,641 | Dreyer | June 5, 1928 |
| 1,676,417 | True | July 10, 1928 |
| 1,952,580 | Boss | Mar. 27, 1934 |
| 1,996,123 | Rodgers | Apr. 2, 1935 |
| 2,088,949 | Fekette | Aug. 3, 1937 |
| 2,166,139 | Guthrie et al. | July 18, 1939 |
| 2,174,840 | Robinson | Oct. 3, 1939 |
| 2,350,823 | Robinson | June 6, 1944 |
| 2,505,287 | Gutterman | Apr. 25, 1950 |

FOREIGN PATENTS

| Number | Country | Date |
|---|---|---|
| 551,638 | Great Britain | Mar. 3, 1943 |
| 592,501 | Great Britain | Sept. 19, 1947 |